(12) United States Patent
Flanigan

(10) Patent No.: US 9,178,405 B2
(45) Date of Patent: Nov. 3, 2015

(54) MAGNETIC DRIVE COUPLING APPARATUS

(75) Inventor: Paul J. Flanigan, Cicero, NY (US)

(73) Assignee: CARRIER CORPORATION, Farmington, CT (US)

(*) Notice: Subject to any disclaimer, the term of this patent is extended or adjusted under 35 U.S.C. 154(b) by 0 days.

(21) Appl. No.: 14/116,587

(22) PCT Filed: May 9, 2012

(86) PCT No.: PCT/US2012/036992
§ 371 (c)(1),
(2), (4) Date: Nov. 8, 2013

(87) PCT Pub. No.: WO2012/158410
PCT Pub. Date: Nov. 22, 2012

(65) Prior Publication Data
US 2014/0066214 A1    Mar. 6, 2014

Related U.S. Application Data

(60) Provisional application No. 61/485,993, filed on May 13, 2011.

(51) Int. Cl.
| F04B 17/00 | (2006.01) |
| H02K 24/00 | (2006.01) |
| H02K 49/10 | (2006.01) |
| H02K 5/128 | (2006.01) |

(52) U.S. Cl.
CPC .............. *H02K 24/00* (2013.01); *H02K 49/106* (2013.01); *H02K 5/128* (2013.01); *Y10T 464/30* (2015.01)

(58) Field of Classification Search
CPC ...... H02K 24/00; H02K 49/106; H02K 5/128
USPC ............. 464/29; 310/75 D, 152, 154.12; 417/420; 62/914; 474/142, 152, 162, 474/902
See application file for complete search history.

(56) References Cited

U.S. PATENT DOCUMENTS

| 3,050,646 A | 8/1962 | Eddy |
| 3,838,581 A | 10/1974 | Endress |

(Continued)

FOREIGN PATENT DOCUMENTS

| DE | 4118788 | 12/1992 |
| GB | 1129166 | 10/1968 |

(Continued)

OTHER PUBLICATIONS

International Search Report issued in PCT/US2012/036992, Mar. 27, 2014, 5 pages.

(Continued)

*Primary Examiner* — Gregory Binda
(74) *Attorney, Agent, or Firm* — Cantor Colburn LLP

(57) ABSTRACT

A magnetic drive coupling apparatus is provided and includes a drive unit having a first rotatable shaft and an open drive assembly, a driven unit having an end face and a second rotatable shaft extending through the end face axially overlap, a magnetic drive coupling having first and second magnetically attractive parts associated with the first and second rotatable shafts, respectively, which transmits rotation between the first and second rotatable shafts and a sealing unit coupled to the end face to encompass the second magnetically attractive part and to hermetically seal oil and refrigerant in an interior of the driven unit.

13 Claims, 2 Drawing Sheets

(56) References Cited

U.S. PATENT DOCUMENTS

| | | | |
|---|---|---|---|
| 4,065,235 A * | 12/1977 | Furlong et al. | 417/420 |
| 4,080,112 A | 3/1978 | Zimmermann | |
| 4,287,976 A * | 9/1981 | Sakaki et al. | 474/902 |
| 4,775,291 A | 10/1988 | Culbertson et al. | |
| 4,800,730 A | 1/1989 | Hipfl et al. | |
| 5,081,876 A | 1/1992 | Marshall | |
| 5,090,944 A | 2/1992 | Kyo et al. | |
| 5,423,661 A * | 6/1995 | Gabeler et al. | 417/420 X |
| 6,223,546 B1 | 5/2001 | Chopko et al. | |
| 6,607,370 B2 * | 8/2003 | Fukamachi et al. | 417/420 |
| 7,614,242 B1 | 11/2009 | Quesada Saborio | |
| 7,635,959 B2 | 12/2009 | Holden et al. | |
| 2005/0095149 A1 * | 5/2005 | Tanaka et al. | 417/420 |
| 2006/0242985 A1 | 11/2006 | Leck et al. | |
| 2006/0245944 A1 | 11/2006 | Leck et al. | |
| 2009/0175748 A1 | 7/2009 | Bush et al. | |
| 2010/0058791 A1 | 3/2010 | Quesada Saborio | |
| 2010/0139298 A1 | 6/2010 | Lifson et al. | |
| 2010/0223938 A1 | 9/2010 | Bush et al. | |
| 2010/0223939 A1 | 9/2010 | Mitra et al. | |

FOREIGN PATENT DOCUMENTS

| | | |
|---|---|---|
| GB | 2145882 | 4/1985 |
| GB | 2216189 | 10/1989 |
| JP | 60125456 | 7/1985 |
| JP | 60211164 | 10/1985 |
| JP | 6169365 | 4/1986 |

OTHER PUBLICATIONS

Written Opinion issued in PCT/US2012/036992, Mar. 27, 2014, 7 pages.

* cited by examiner

US 9,178,405 B2

MAGNETIC DRIVE COUPLING APPARATUS

CROSS REFERENCE TO RELATED APPLICATION

This application is a National Stage Application of PCT/US12/036992 filed May 9, 2012, which claims priority to U.S. Provisional Application No. 61/485,993 filed May 13, 2011, the disclosures of which are incorporated by reference herein in their entireties.

BACKGROUND OF THE INVENTION

Aspects of the invention are directed to a magnetic drive coupling apparatus.

Reciprocating and other types of compressors often have an open drive configuration whereby a compressor is coupled to a motor or engine. In such cases, the crankshaft of the compressor has a mechanical face seal, which seals refrigerant and other fluids in the interior of the compressor but also allows for the coupling to the motor or engine. The face seal operates with a film of oil between a stationary stator and the rotor, which rotates with the crankshaft. Due to the nature of the seal, however, it has been observed that oil tends to leak and drip outside of the sealed compressor. This causes complaints in the field and leads to the need for rework of compressors.

BRIEF DESCRIPTION OF THE INVENTION

A magnetic drive coupling apparatus is provided and includes a drive unit having a first rotatable shaft and an open drive assembly, a driven unit having an end face and a second rotatable shaft extending through the end face axially overlap, a magnetic drive coupling having first and second magnetically attractive parts associated with the first and second rotatable shafts, respectively, which transmits rotation between the first and second rotatable shafts and a sealing unit coupled to the end face to encompass the second magnetically attractive part and to hermetically seal oil and refrigerant in an interior of the driven unit.

A magnetic drive coupling apparatus is provided and includes a drive unit having a first rotatable shaft and an open drive assembly, a driven unit having an end face and a second rotatable shaft extending through the end face, a magnetic drive coupling having first and second magnetically attractive parts rotatably associated with the first and second rotatable shafts, respectively, which transmits rotation of the first rotatable shaft to the second rotatable shaft and a sealing unit coupled to the end face to encompass the second magnetically attractive part and to prevent leakage of fluid from the driven unit.

A magnetic drive coupling apparatus is provided and includes a drive unit having a first rotatable shaft, an outer drive coupling exposed to atmospheric conditions and rotatable with the first rotatable shaft and having a fan pulley, a driven unit having an end face and a second rotatable shaft extending through the end face, a magnetic drive coupling having first and second magnetically attractive parts rotatably associated with the first and second rotatable shafts, respectively, which transmits rotation of the first rotatable shaft to the second rotatable shaft and a sealing unit coupled to the end face to encompass the second magnetically attractive part and to prevent leakage of fluid from the driven unit.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Aspects of the invention eliminate the face seal of conventional configurations and instead employ a sealed magnetic drive coupling. The magnetic drive coupling has a hermetically sealed pressure barrier between a refrigerant side thereof and an atmospheric side thereof. Magnets are used to provide torque from an engine or other drive source (i.e., electric or hydraulic motors) to a compressor through the pressure barrier. A drive pulley may be combined with one half of the magnetic drive coupling. Elimination of the face seal creates a hermetically sealed open drive compressor that does not suffer from oil and/or refrigerant leaks and related repair costs.

Figure 1:
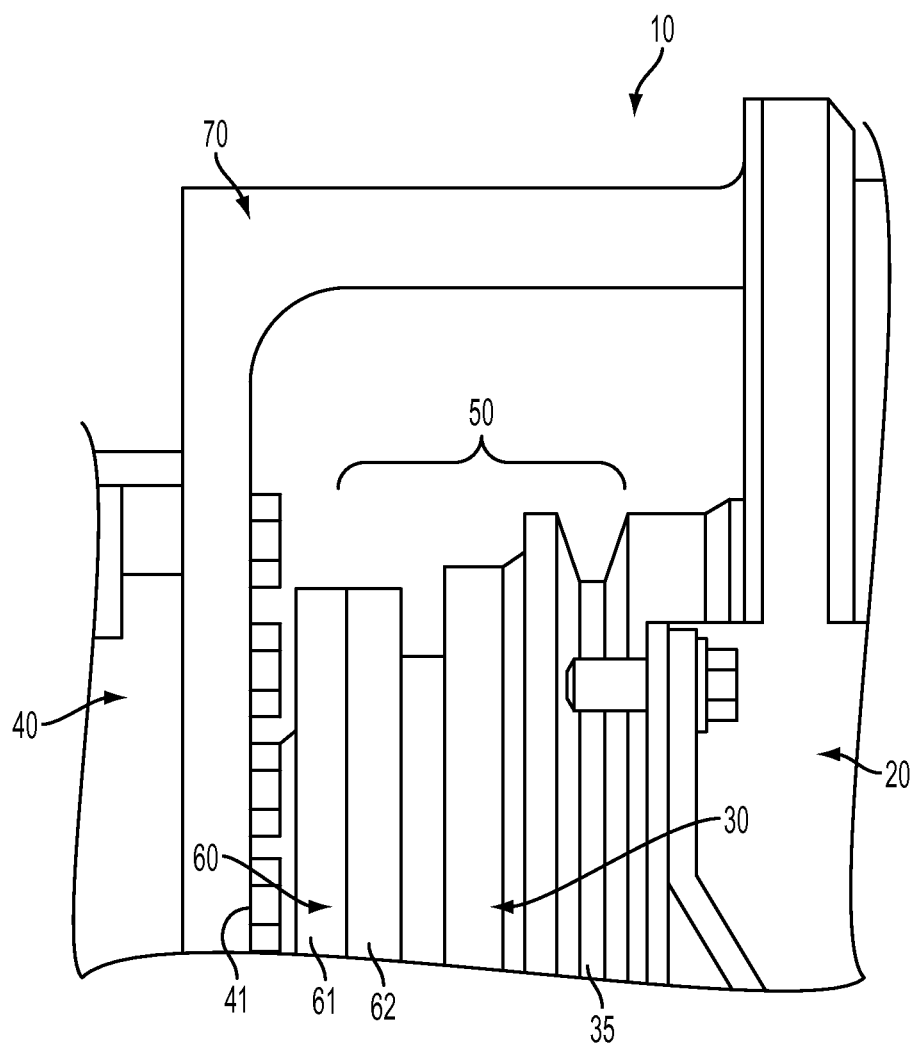
FIG. 1 is an enlarged side view of a compressor coupled to an engine.
Figure 2:
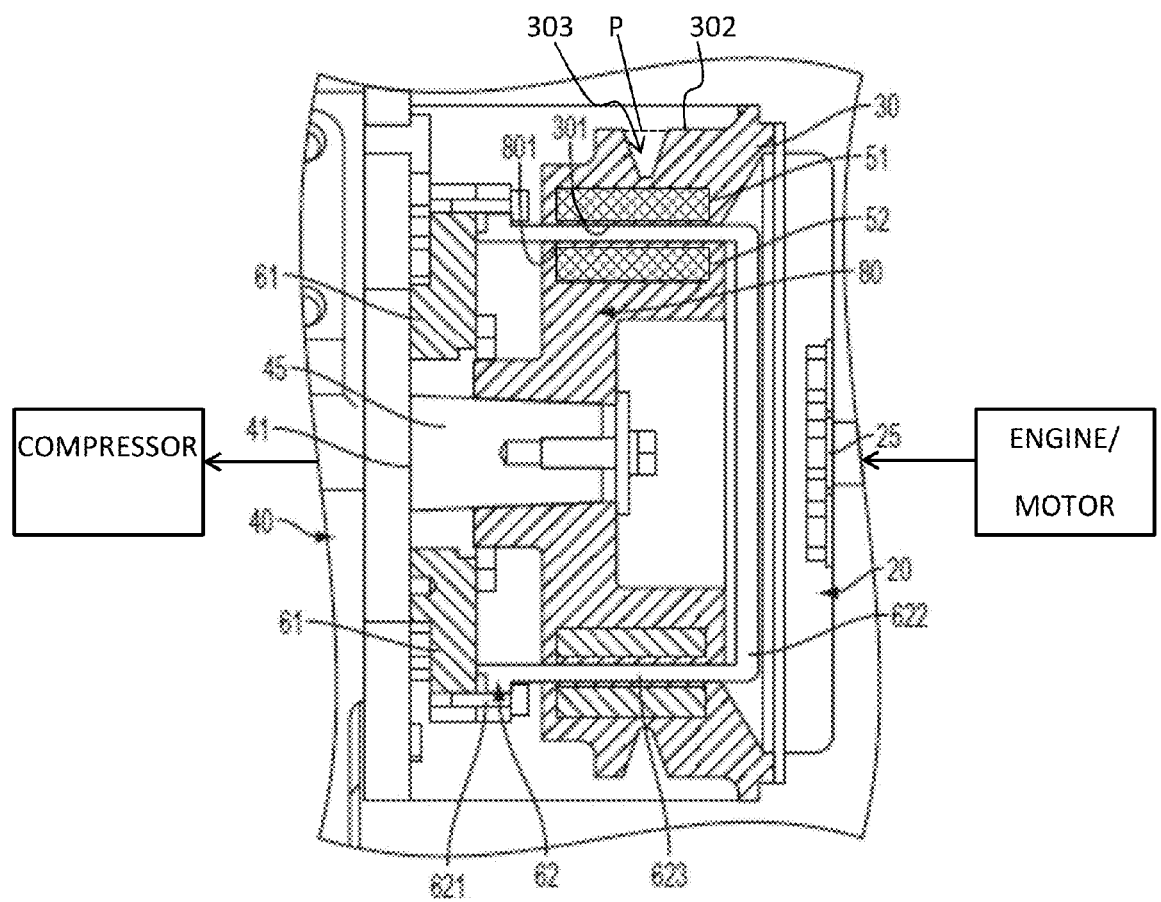
FIG. 2 is a cutaway side view of a magnetic drive coupling between the compressor and the engine.

With reference to FIGS. 1 and 2, a magnetic drive coupling apparatus 10 is provided. The magnetic drive coupling apparatus 10 includes a drive unit 20, such as an engine or a motor, having a first rotatable shaft 25, an outer drive coupling 30 that is exposed to atmospheric conditions, is rotatable with the first rotatable shaft 25 and has a fan pulley 35, a driven unit 40, such as a compressor, having an end face 41 and a second rotatable shaft 45 extending axially through the end face 41, a magnetic drive coupling 50 and a sealing unit 60. The magnetic drive coupling 50 has first and second magnetically attractive parts 51 and 52, which are rotatably associated with the first and second rotatable shafts 25 and 45, respectively. The magnetic drive coupling 50 is thus configured to transmit rotation of the first rotatable shaft 25 to the second rotatable shaft 45 and vice versa in some cases. The sealing unit 60 is coupled to the end face 41 and configured to encompass at least the second magnetically attractive part 52 and to prevent leakage of fluid, such as oil and/or refrigerant, from an interior of the driven unit 40.

The magnetic drive coupling 10 may further include a partial housing 70, which is mounted to the drive unit 20 at a first side thereof and the driven unit 40 at a second side thereof. The housing 70 does not encompass the magnetic drive coupling 50 so that the outer drive coupling 30 is exposed to the atmospheric conditions and so that the fan pulley 35 can be connectable with a fan pulley assembly, such as a fan belt and a secondary drive shaft for, e.g., a fan. The housing 70 increases stability of a connection between the drive unit 20 and the driven unit 40.

As shown in FIG. 1, the end face 41 of the driven unit 40 has a given bolt pattern to which the sealing unit 60 is coupled. In particular, the sealing unit 60 includes an adapter plate 61 to mate with the given bolt pattern of the end face 41 in a new construction or a retrofit assembly process. Also, in a new construction, the adapter plate 61 may be incorporated in the design of the driven unit 40. The sealing unit 60 further includes a pressure barrier 62, which is coupled to the adapter plate 61 to form a hermetic seal encompassing at least the second magnetically attractive part 52. This hermetic seal thus exposes the second magnetically attractive part 52 to fluid, such as oil and/or refrigerant, but otherwise prevents leakage of fluid, such as oil and/or refrigerant, from an interior of the driven unit 40. As shown in FIG. 2, the pressure barrier 62 has an annular mating section 621 that mates with or is fastened to the adapter plate 61, a closed end 622 and an annular sidewall 623 extending axially between the mating section 621 and the closed end 622. The pressure barrier 62 may axially overlap with an end portion of the second rotatable shaft 45 and an end portion of the outer drive coupling 30.

The first and second magnetically attractive parts 51 and 52 may include permanent magnets that are arranged to be attractive to one another and are housed or otherwise contained within the outer drive coupling 30 and an inner drive coupling 80, which is operably coupled to the end potion of the second rotatable shaft 45 such that rotation of the inner drive coupling 80 causes the second rotatable shaft 45 to rotate as well.

The outer drive coupling 30 has a radially inward facing surface 301 and a radially outward facing surface 302. The radially outward facing surface 302 is formed to define a radial plane P along which the fan pulley 35 (see FIG. 2) is defined as a groove 303 in which a fan belt or chain can sit. The groove can be smooth or toothed. The radially inward facing surface 301 is disposable proximate to a radially outward facing surface of the pressure barrier 62. The first magnetically attractive part 51 is disposed to extend axially along the radially inward facing surface 301 of the outer drive coupling 30. Similarly, the inner drive coupling 80 may be formed as an integral body with a radially inner part operably coupled to the second rotatable shaft 45 and a radially outer part 801 disposable proximate to a radially inward facing surface of the pressure barrier 62. The second magnetically attractive part 52 is disposed to extend axially along this radially outer part of the inner drive coupling 80.

The first magnetically attractive part 51 may be disposed radially about the second magnetically attractive part 52 while the first and second magnetically attractive parts 51 and 52 may be arrayed circumferentially about the second rotatable shaft 45 or in any known configuration. In any case, rotation of the first rotatable shaft 25 causes rotation of the outer drive coupling 30 and, in turn, causes rotation of the first magnetically attractive part 51. This rotation and the attraction between the first and second magnetically attractive parts 51 and 52 thus causes the second magnetically attractive part 52, the inner drive coupling 80 and the second rotatable shaft 45 to rotate as well.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A magnetic drive coupling apparatus, comprising:
  a drive unit having a first rotatable shaft and an outer drive coupling rotatable with the first rotatable shaft, the outer drive coupling comprising a radially inwardly facing surface and a radially outwardly facing surface along which a fan pulley groove is defined;
  a driven unit having an end face and a second rotatable shaft extending through the end face;
  a magnetic drive coupling transmitting rotation between the first and second rotatable shafts and having a first magnetically attractive part disposed along the radially inwardly facing surface and associated with the first rotatable shaft and a second magnetically attractive part associated with the second rotatable shaft; and
  a sealing unit coupled to the end face to encompass the second magnetically attractive part and to prevent leakage from the driven unit, the sealing unit comprising an adapter plate to mate with a bolt pattern of the end face and a pressure barrier coupled to the adapter plate to form a hermetic seal encompassing the second magnetically attractive part, the pressure barrier axially overlapping with an end portion of the second rotatable shaft and the outer drive coupling and comprising an annular mating section that mates with the adapter plate, a closed end and an annular sidewall extending axially between the mating section and the closed end.

2. The magnetic drive coupling apparatus according to claim 1, wherein the drive unit comprises one of an engine or a motor.

3. The magnetic drive coupling apparatus according to claim 1, wherein the outer drive coupling is exposed to atmospheric conditions.

4. The magnetic drive coupling apparatus according to claim 1, wherein the driven unit comprises a compressor.

5. The magnetic drive coupling apparatus according to claim 1, wherein the first and second magnetically attractive parts comprise permanent magnets.

6. The magnetic drive coupling apparatus according to claim 1, wherein the first and second magnetically attractive parts are arrayed circumferentially about the second rotatable shaft.

7. The magnetic drive coupling apparatus according to claim 1, wherein the first magnetically attractive part is disposed radially outwardly of the second magnetically attractive part.

8. A magnetic drive coupling apparatus, comprising:
  a drive unit having a first shaft;
  an outer drive coupling exposed to atmospheric conditions and rotatable with the first shaft and comprising a radially inwardly facing surface and a radially outwardly facing surface defining a radial plane along which a fan pulley groove is defined as a recess from the radial plane toward the radially inwardly facing surface;
  a driven unit having an end face and a second shaft extending through the end face;
  a magnetic drive coupling transmitting rotation between the first and second shaft and having a first magnetically attractive part disposed along the radially inwardly facing surface, coaxial with the recess and associated with the first shaft and a second magnetically attractive part associated with the second shaft; and
  a sealing unit coupled to the end face to encompass the second magnetically attractive part and to prevent leakage from the driven unit, the sealing unit comprising an adapter plate to mate with a bolt pattern of the end face and a pressure barrier coupled to the adapter plate to form a hermetic seal encompassing the second magnetically attractive part and comprising an annular mating section that mates with the adapter plate, a closed end and an annular sidewall, wherein the magnetic drive coupling is axially interposed between the annular mating section and the closed end and the annular sidewall extends axially between the mating section and the closed end and axially overlaps with an end portion of the second shaft and the fan pulley groove of the outer drive coupling.

9. The magnetic drive coupling apparatus according to claim 8, wherein the drive unit comprises one of an engine or a motor.

10. The magnetic drive coupling apparatus according to claim 8, wherein the driven unit comprises a compressor.

11. The magnetic drive coupling apparatus according to claim 8, wherein the first and second magnetically attractive parts comprise permanent magnets.

12. The magnetic drive coupling apparatus according to claim 8, wherein the first and second magnetically attractive parts are arrayed circumferentially about the second shaft.

13. The magnetic drive coupling apparatus according to claim 8, wherein the first magnetically attractive part is disposed radially outwardly of the second magnetically attractive part.

* * * * *